W. S. HADAWAY, Jr.
ELECTRIC HEATING AND COOKING DEVICE.
APPLICATION FILED MAY 1, 1909.
1,086,165.
Patented Feb. 3, 1914.
3 SHEETS—SHEET 1.
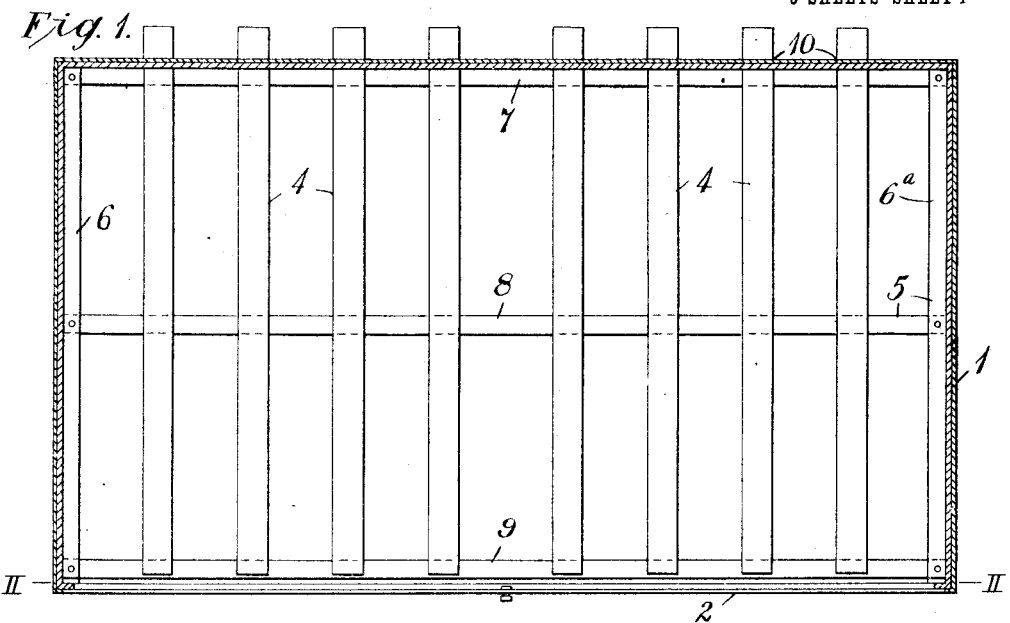
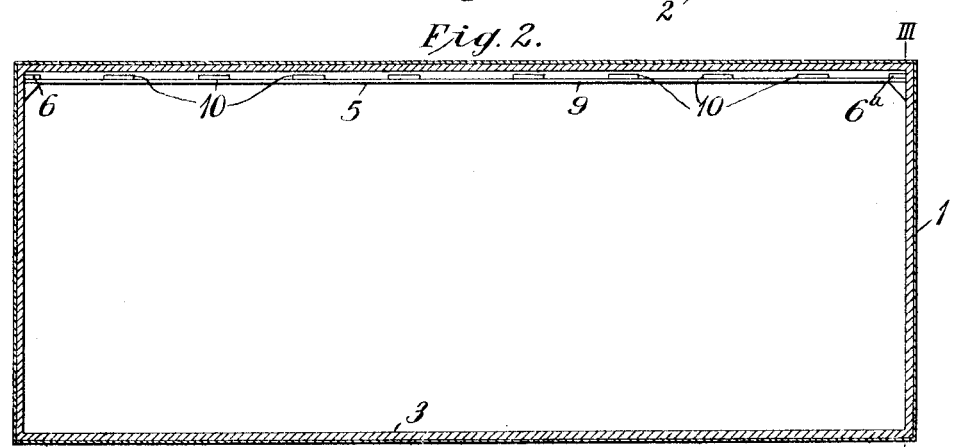
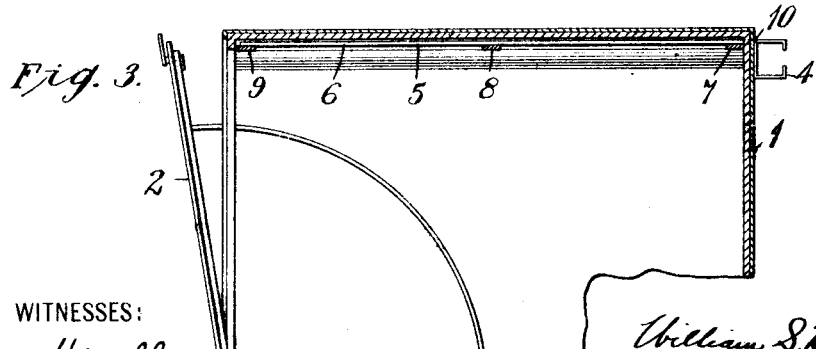
WITNESSES:
INVENTOR
William S. Hadaway, Jr.
BY
Wesley G. Carr
ATTORNEY W. S. HADAWAY, Jr.
ELECTRIC HEATING AND COOKING DEVICE.
APPLICATION FILED MAY 1, 1909.
1,086,165.
Patented Feb. 3, 1914
3 SHEETS—SHEET 2.
Fig. 4.
Fig. 5.
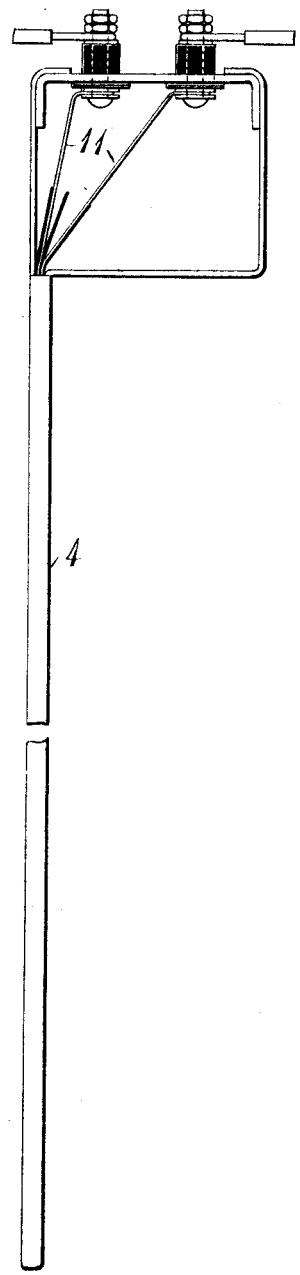
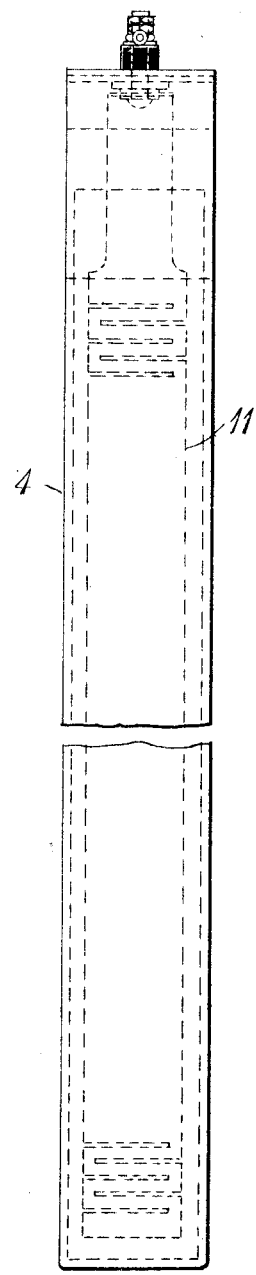
WITNESSES:
INVENTOR
William S. Hadaway Jr.
BY
ATTORNEY W. S. HADAWAY, Jr.
ELECTRIC HEATING AND COOKING DEVICE.
APPLICATION FILED MAY 1, 1909.
1,086,165.
Patented Feb. 3, 1914.
3 SHEETS—SHEET 3.
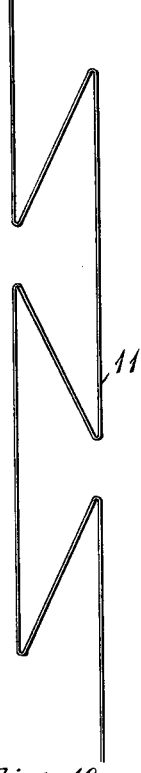
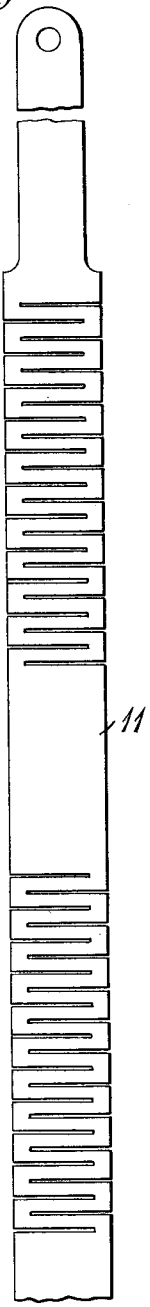
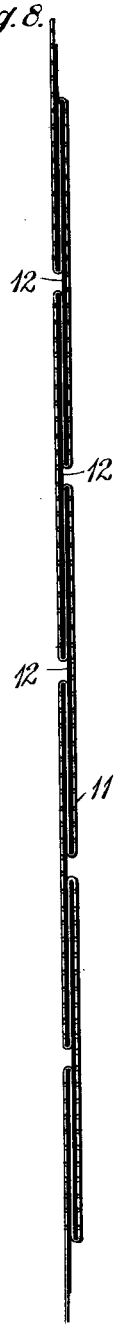
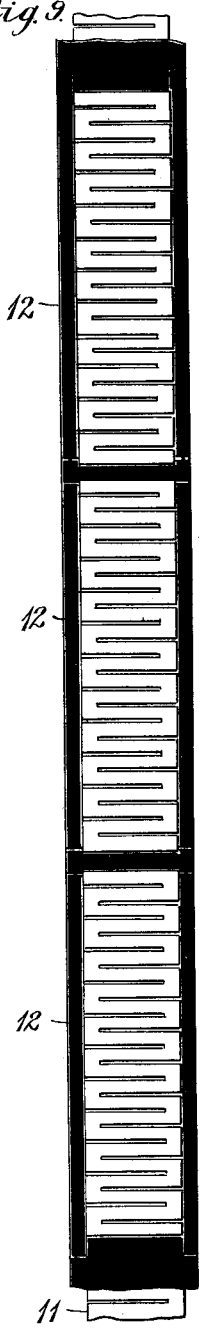
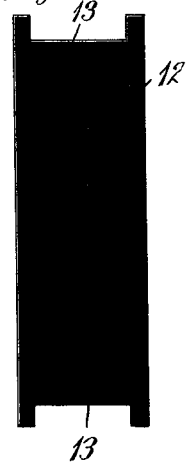
WITNESSES:
INVENTOR
William S. Hadaway Jr.
BY
ATTORNEY

UNITED STATES PATENT OFFICE.

WILLIAM S. HADAWAY, JR., OF EAST ORANGE, NEW JERSEY, ASSIGNOR TO WESTINGHOUSE ELECTRIC AND MANUFACTURING COMPANY, A CORPORATION OF PENNSYLVANIA.

ELECTRIC HEATING AND COOKING DEVICE.

1,086,165.

Specification of Letters Patent.     Patented Feb. 3, 1914.

Application filed May 1, 1909. Serial No. 493,405.

*To all whom it may concern:*

Be it known that I, WILLIAM S. HADAWAY, Jr., a citizen of the United States, and a resident of East Orange, in the county of Essex and State of New Jersey, have invented a new and useful Improvement in Electric Heating and Cooking Devices, of which the following is a specification.

My invention relates to electric heating and cooking apparatus, and it has special reference to electrically heated ovens.

One object of my invention is to provide a simple and durable heater unit which may be utilized for various purposes and another object of my invention is to provide an oven or similar device which is adapted to be heated by a plurality of the heating units, just referred to, and which is economical in the use of electric energy.

When relatively large chambers, such as ovens and similar devices, are heated electrically, an extensive electric heater is required, and, if this heater is injured in any way, the whole device is likely to be rendered inoperative.

According to my present invention, I provide a large number of heating units which are interchangeable and may readily and cheaply be replaced in case of injury and which may be so electrically connected together in various circuit combinations as to produce a greater or less degree of heat when connected directly across a constant-potential circuit. Each of the units is rigid and durable and is arranged to produce heat with a minimum expenditure of electrical energy.

Figure 1 of the accompanying drawings is a plan view, with the top removed, Fig. 2 a sectional elevation on line 2—2 of Fig. 1 and Fig. 3 a similar view on the line 3—3 of Fig. 2 of an electrically heated oven embodying my invention. Figs. 4 and 5 are views, at right angles to each other, on a larger scale, of one of the heating units shown in Figs. 1, 2 and 3, and Figs. 6, 7, 8 and 9 are detail views of the heating unit of Figs. 4 and 5.

Referring to Figs. 1, 2 and 3 of the drawings, the device here shown comprises a box or oven 1 having a door 2 constituting one of the side walls and hinge-connected to the body plate 3, and a plurality of heating units 4 which are removably secured in position within the oven near its top plate. The box or oven may be of any suitable construction, preferably having an angle iron frame to which sheet metal plates, constituting the walls of the device, are attached. Near the top of the oven, a frame 5 is provided which is composed of bars 6 and 6ª and cross bars 7, 8 and 9. The bars 6, 6ª, 7 and 9 are adjacent to the walls of the device and the bar 8 is secured to the bars 6 and 6ª substantially midway between the bars 7 and 9. At the back of the oven, just above the bar 7, a plurality of holes 10 are provided to receive the electric heating units. Each of the units is in the form of a flat bar and is of such length as to rest upon the cross bars 7, 8 and 9 of the frame 5 when its active part is entirely within the oven. The terminal end of each unit is enlarged, as hereinafter described, and the arrangement of parts is such that the unit is properly placed when the enlargement comes against the side plates of the oven.

Referring to Figs. 4 to 9, inclusive, in which the detailed structure of the heater units is illustrated, a resistance strip or ribbon 11 having a series of similar groups of slots cut alternately from opposite edges to provide a zig-zag path for the electric current (see Fig. 7), is plaited as shown in Figs. 6 and 8 to increase the length of the resistance element, a strip 12 of insulation, having notches 13 at its ends, being inserted in each plait to separate the outer surfaces from the folded-in surfaces. The plaited ribbon is not necessarily slotted in any portion but the arrangement of the groups of slots, as shown, is such that the folded-in surfaces of the ribbon have a large current-carrying capacity, no slots being located in these parts, while the outer surfaces, from which the heat may be more readily radiated, are slotted to increase the resistance. This resistance element is not limited in its use to the unit illustrated in the other figures, but may be employed for any suitable purpose. In adapting this type of resistance element, however, to the unit shown in Figs. 4 and 5, the plaited ribbon is obviously folded back on itself in order that both of the terminals may be brought out at the same end of the unit. These terminal ends are also of relatively large current-carrying capacity so as to avoid overheating the resistance at these points.

The plaited ribbon is preferably assembled between two insulating strips or ribbons which are not injured by heat and which are adapted to be fused together so as to embody the resistance ribbon in a homogeneous mass of insulation upon the application of heat and pressure. After the ribbon is insulated in this manner, it is provided with a sheath of metal which may be constructed in any suitable way, but is preferably composed of two strips of sheet iron welded together at their edges.

When the heater is to be subjected to very high temperature it may be desirable to employ clear mica for the insulation and, when this is used, the notched strips 12 serve to center the ribbon within the outer metal jacket or sheath.

The terminal ends of the casing are separated for a short distance, one of them being offset by making two right angle bends, as shown in Fig. 4, in order to provide a guard for the terminals of the resistance element. This guard is completed by means of a U-shaped punching of sheet iron to which terminal blocks are mechanically secured and from which they are electrically insulated by bolts and insulating bushings.

It may be found of special advantage in some cases to apply a series of the herein described metal-clad resistance bars to devices of the class illustrated in Patent No. 890,858, granted, June 16, 1908, to the Hadaway Electric Heating & Engineering Co., comprising metal spacing bars between which the resistance is assembled. In case of injury, any one of the units could then be removed and replaced without necessitating the replacement of the entire resistance I do not desire to be limited to the structures illustrated and it will be evident to those skilled in the art that structural modifications may be effected within the scope of my invention.

I claim as my invention:

1. An electric resistance element comprising a resistance ribbon folded upon itself at intervals of its length to form an end-to-end series of longitudinally disposed plaits.

2. A resistance element comprising a resistance ribbon folded upon itself at intervals of its length to form a series of double plaits and insulating strips fitted into the plaits.

3. An electric resistance element comprising a resistance ribbon folded upon itself at intervals of its length to form a series of double plaits, the folded-in portions being of relatively low resistance and the remaining portions being of relatively high resistance.

4. An electric resistance element comprising a resistance ribbon folded upon itself at intervals of its length to form a series of plaits, the folded-in portions and the terminal portions being of relatively high current-carrying capacity and the remaining portions being of relatively low current-carrying capacity.

5. An electric resistance device comprising a plaited resistance ribbon and insulating strips fitted into the plaits, said strips being of materially greater width than the ribbon and having notches at their ends.

6. An electric resistance element comprising insulating strips and a resistance ribbon folded upon said strips at intervals of its length to form an end-to-end series of longitudinally disposed plaits.

7. An electric resistance device comprising a plaited resistance ribbon, insulating strips fitted into the plaits, and strips of insulation between which the resistance ribbon is assembled, said insulating strips being adapted to be fused together around the resistance strip.

8. A resistance device comprising a resistance element, a metal sheath composed of strips between which the resistance element is assembled, said strips being secured together at their edges and being offset at one end, and a plurality of terminal members supported by the offset portions of the strips.

9. A resistance device comprising a resistance element and a metal sheath composed of strips secured together at their edges, except at one end, where they are separated to provide a guard for the terminals of the resistance element.

10. In an electric heating apparatus, the combination with a box or casing having a plurality of holes in one wall and interchangeable heating units having enlarged terminal portions and body portions which extend through the holes in the wall of the device.

11. A heater element comprising a longitudinally extending electric conductor having a series of plaits and an impervious metal sheath insulated therefrom and composed of strips the side and end edges of which are welded together to form a homogeneous structure.

12. A heater element comprising an insulated resistance strip having an end-to-end series of longitudinally disposed plaits and an impervious metal sheath composed of strips the side and end edges of which are welded together to form a homogeneous structure.

13. A heater element comprising an insulated conductor, an impervious metal sheath from one end of which said conductor projects and a protecting frame or casing for the projecting portion or portions of the conductor.

14. A heater element comprising an insulated strip conductor, an impervious metal sheath composed of strips having their side and end edges welded together and a terminal-supporting end frame or casing.

In testimony whereof, I have hereunto subscribed my name this 20th day of April, 1909.

WILLIAM S. HADAWAY, Jr.

Witnesses:
R. J. DEARBORN,
B. B. HINES.